(12) United States Patent
Lee et al.

(10) Patent No.: US 7,986,466 B2
(45) Date of Patent: Jul. 26, 2011

(54) VARIFOCAL LENS

(75) Inventors: Seung-wan Lee, Suwon-si (KR);
Jeong-yub Lee, Seoul (KR); Woon-bae Kim, Suwon-si (KR); Seung-tae Choi, Osan-si (KR)

(73) Assignee: Samsung Electro Mechanics Co., Ltd, Suwon-si (KR)

( * ) Notice: Subject to any disclaimer, the term of this patent is extended or adjusted under 35 U.S.C. 154(b) by 253 days.

(21) Appl. No.: 12/107,295

(22) Filed: Apr. 22, 2008

(65) Prior Publication Data
US 2009/0180198 A1      Jul. 16, 2009

(30) Foreign Application Priority Data

Jan. 11, 2008  (KR) .................. 10-2008-0003600

(51) Int. Cl.
*G02B 1/06* (2006.01)
(52) U.S. Cl. ........................ 359/666; 359/665
(58) Field of Classification Search ........... 359/665–666
See application file for complete search history.

(56) References Cited

FOREIGN PATENT DOCUMENTS
WO    WO 2005069044 A2 *   7/2005
WO    WO 2005093489 A2 *  10/2005

* cited by examiner

*Primary Examiner* — Joseph Martinez
*Assistant Examiner* — James R Greece
(74) *Attorney, Agent, or Firm* — Sughrue Mion, PLLC

(57) ABSTRACT

A varifocal lens includes a hollow case having first and second sidewalls facing each other, the first and second sidewalls through which a light passes; at least one light transmission membrane partitioning an inner space of the case into at least two liquid chambers, the at least one light transmission membrane through which a light passes; at least two liquids filled in the at least two liquid chambers; at least one first operating hole formed at the first sidewall; a first actuator disposed to cover the at least one first operating hole and to pressurize the liquid contacting the first sidewall; and a controller configured to control the first actuator to change a focal distance of an optical lens consisting of the first and second sidewalls, the at least two liquids, and the at least one light transmission membrane of the case.

20 Claims, 4 Drawing Sheets

VARIFOCAL LENS

CROSS-REFERENCE TO RELATED APPLICATIONS

This application claims the benefit under 35 U.S.C. §119(a) from Korean Patent Application No. 2008-3600 filed Jan. 11, 2008 in the Korean Intellectual Property Office, the disclosure of which is incorporated herein by reference in its entirety.

BACKGROUND OF THE INVENTION

1. Field of the Invention

The present invention relates to an optical lens. More particularly, the present invention relates to a varifocal lens formed so that to change a pressure to be applied to a liquid forming a liquid optical lens causes a curvature of an elastic light transmission membrane to be varied, thereby changing a focal distance thereof.

2. Description of the Related Art

Generally, an optical lens refers to a transparent body having at least two refractive surfaces with refractive index difference therebetween. The optical lens has been widely used in various fields such as cameras, telescopes, microscopes, etc.

For example, the optical lens is used in camera modules used in individual portable devices such as cellular phones, personal digital assistants (PDA), etc. Nowadays, the individual portable device has been developed into a multifunctional electronic device including, but not limited to, a camera function, a game function, a music playing function, a broadcasting function, an internet function, etc. in addition to a simple voice transmitting/receiving function. Therefore, the individual portable devices are required to integrate many functions in a small space.

Also, for acquiring better images the camera module has been formed to have an auto focus function, an auto zoom function, an auto macro function, an anti-shake function, etc. However, the camera module having the various advanced functions as described above is limited to reduce a size thereof because of sizes of lenses, and a size of a mechanical lens driving apparatus.

In other words, the various advanced functions are required to have many kinds of lenses, such as macro lenses (close-up lenses), standard lenses, telephoto lenses, zoom lenses, etc. Then, a lens mounted on the camera module needs to be replaced by other lens according to its usage. The auto focus function is required to adjust an optical characteristic of the lens, that is, a focal distance of the lens so that separate motor and driver are required to adjust the focal distance. As a result, the camera module having the advanced functions inevitably has a large size. So to use the camera module having the various advanced functions in the individual portable device smaller in size is difficult.

For solving this problem, liquid lenses (fluid lenses) have been developed using an electrowetting phenomenon.

In the liquid lens, a surface tension of the liquid is changed according to voltage, and the change of the surface tension causes the curvature of the lens to be varied. So, the auto focus function and the zoom function can be realized. The curvature of the liquid lens is varied by the electrowetting phenomenon. The liquid lens using the electrowetting phenomenon is not required to mechanically move the lens so that the camera module can be formed smaller in size.

Furthermore, there is another kind liquid lens configured to change a pressure of a liquid. The liquid lens changes a pressure applied to an optical liquid filled in a lens chamber, thereby changing a curvature of an elastic light transmission membrane disposed in the lens chamber. So the auto focus function and the zoom function of the liquid lens can be realized. This type liquid lens also needs no mechanical lens movement so that the camera module can be formed smaller in size.

However, a varifocal lens using a method applying a pressure to a liquid is substantially affected by gravity. Therefore, the varifocal lens has a limitation of the size to be manufactured.

SUMMARY OF THE INVENTION

The present invention is related to a varifocal lens that can minimize an affection of gravity.

The present invention is also related to a varifocal lens that can prevent an optical resolution of a circumferential portion thereof from decreasing when doing macro photography.

The above aspect and/or other feature of the present invention can substantially be achieved by providing a varifocal lens, which includes a hollow case having first and second sidewalls facing each other, the first and second sidewalls through which a light passes; at least one light transmission membrane partitioning an inner space of the case into at least two liquid chambers, the at least one light transmission membrane through which a light passes; at least two liquids filled in the at least two liquid chambers; at least one first operating hole formed at the first sidewall; a first actuator disposed to cover the at least one first operating hole and to pressurize the liquid contacting the first sidewall; and a controller configured to control the first actuator to change a focal distance of an optical lens consisting of the first and second sidewalls, the at least two liquids, and the at least one light transmission membrane of the case.

The at least two liquids may include two liquids having the same specific gravity or two liquids having specific gravity difference of approximately 0.05 and less.

Also, the at least two liquids may include two liquids having refractive index difference of approximately 0.1 and more.

The at least one light transmission membrane may include a polydimethylsiloxane (PDMS).

The first actuator may be formed of a material including dielectric elastomers, such as arcrylate, silicone, etc.

The first actuator may be formed of a material including electrostrictive polymers, such as copolymers of vinylidene fluoride and trifluoroethylene (PVDF-TrFE), etc.

The first actuator may be formed of ion conductive polymers.

The at least two liquids may include two liquids of different kinds from each other.

The at least two liquids may be immiscible with each other.

The second sidewall may include at least one second operating hole; and a second actuator disposed to cover the at least one second operating hole.

Each of the first and second actuator may be disposed to operate in a direction parallel with respect to an optical axis of the optical lens.

The case may be formed of a glass or a polymer molding.

According to another aspect of the present invention, a varifocal lens may include a first light transmission substrate having at least one first operating hole; a lens frame disposed at a top surface of the first light transmission substrate to form a first liquid chamber; a second light transmission substrate disposed at a top surface of the lens frame to form a second liquid chamber; a light transmission membrane disposed at the lens frame to cover a lens hole formed at the lens frame; a first actuator disposed at a bottom surface of the first light transmission substrate to cover the at least one first operating hole; first and second liquids filled in each of the first and second liquid chambers, the first and second liquids having specific gravity difference of approximately 0.05 and less; and a controller configured to control the first actuator.

The first and second liquids may have refractive index difference of approximately 0.1 and more.

The second light transmission substrate may include at least one second operating hole; and a second actuator disposed at the at least one second operating hole.

The first and second light transmission substrates may be formed of a glass.

The lens frame may be formed of a silicone.

The first and second light transmission substrates and the lens frame may be manufactured using a semiconductor fabrication process in a wafer level.

Also, a surface of each of the first and second light transmission substrates may be formed in an aspherical surface.

A surface of the second light transmission substrate contacting the second liquid may be formed in an optical curved surface.

According to another aspect of the present invention, a varifocal lens may include a first liquid chamber filled with a first liquid; a second liquid chamber filled with a second liquid, the second liquid having the same specific gravity as that of the first liquid, or the second liquid having specific gravity difference between the first and second liquids of approximately 0.05 and less, and the second liquid having refractive index difference between the first and second liquids of approximately 0.1 and more; a light transmission membrane disposed between the first and second liquid chambers; a first actuator disposed at the first liquid chamber to pressurize the first liquid; and a controller operating the first actuator; wherein the controller controls the first actuator to change a focal distance of an optical lens consisting of the first liquid chamber, the first liquid, the light transmission membrane, the second liquid, and the second liquid chamber.

According to another aspect of the present invention, a varifocal lens may include a first light transmission substrate having at least one first operating hole; a first lens frame disposed at a top surface of the first light transmission substrate to form a first liquid chamber; a second lens frame disposed at a top surface of the first lens frame to form a second liquid chamber; a second light transmission substrate disposed at a top surface of the second lens frame to form a third liquid chamber; first and second light transmission membranes disposed at each of the first and second lens frames to cover first and second lens holes formed at each of the first and second lens frame; first, second, and third liquids filled in each of the first, second, and third liquid chambers; a first actuator disposed at a bottom surface of the first light transmission substrate to cover the at least one first operating hole and to pressurize the first liquid; and a controller configured to control the first actuator to change a focal distance of an optical lens consisting of the first and second light transmission substrates, the first, second, and third liquids, and the first and second light transmission membranes.

The first, second, and third liquids may include three liquids having the same specific gravity or three liquids having specific gravity difference of approximately 0.05 and less.

Also, refractive index of the second liquid may be larger than refractive index of each of the first and third liquids.

A diameter of the first lens hole may be larger than a diameter of the second lens hole.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE EXEMPLARY EMBODIMENTS

Hereinafter, certain exemplary embodiments of the present invention will be described in detail with reference to the accompanying drawings.

The matters defined in the description, such as a detailed construction and elements thereof, are provided to assist in a comprehensive understanding of the invention. Thus, it is apparent that the present invention may be carried out without those defined matters. Also, well-known functions or constructions are omitted to provide a clear and concise description of exemplary embodiments of the present invention.

Figure 1:
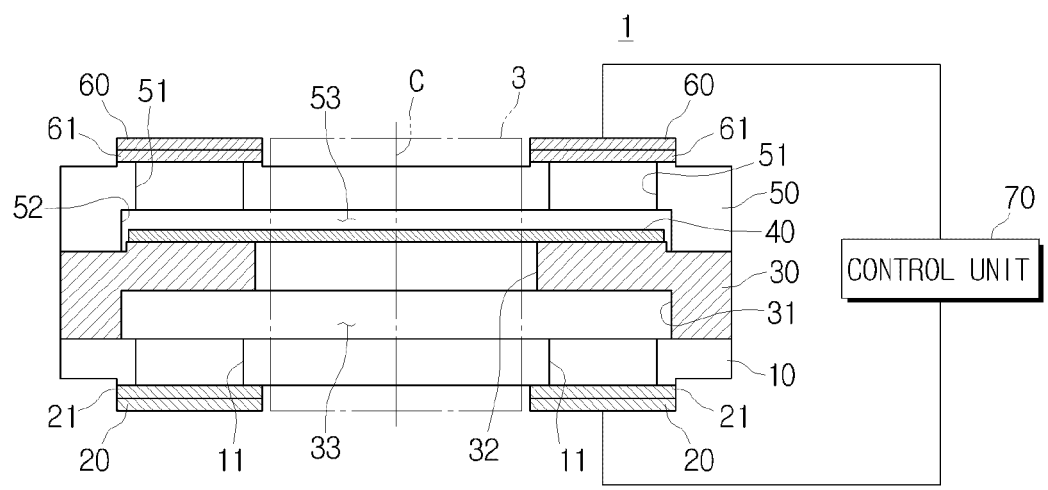
FIG. 1 is a sectional view schematically illustrating a varifocal lens according to an exemplary embodiment of the present invention.
Figure 2:
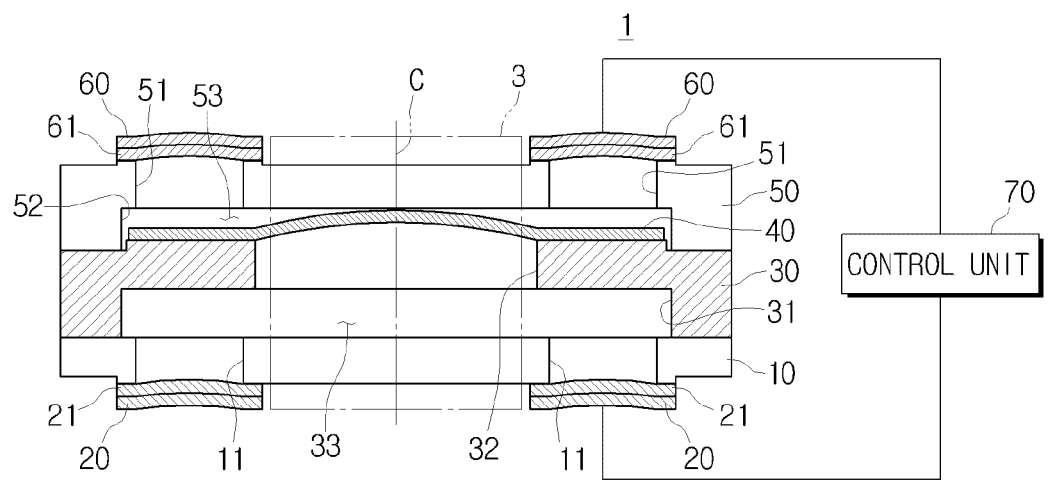
FIG. 2 is a sectional view schematically illustrating the varifocal lens of FIG. 1 when a first actuator of the varifocal lens operates.

FIG. 1 is a sectional view schematically illustrating a varifocal lens 1 according to an exemplary embodiment of the present invention. FIG. 2 is a sectional view schematically illustrating the varifocal lens 1 of FIG. 1 when a first actuator 20 of the varifocal lens 1 operates.

Referring to FIGS. 1 and 2, the varifocal lens 1 according to an exemplary embodiment of the present invention includes a first light transmission substrate 10, a lens frame 30, a second light transmission substrate 50, and a controller 70.

Figure 3:
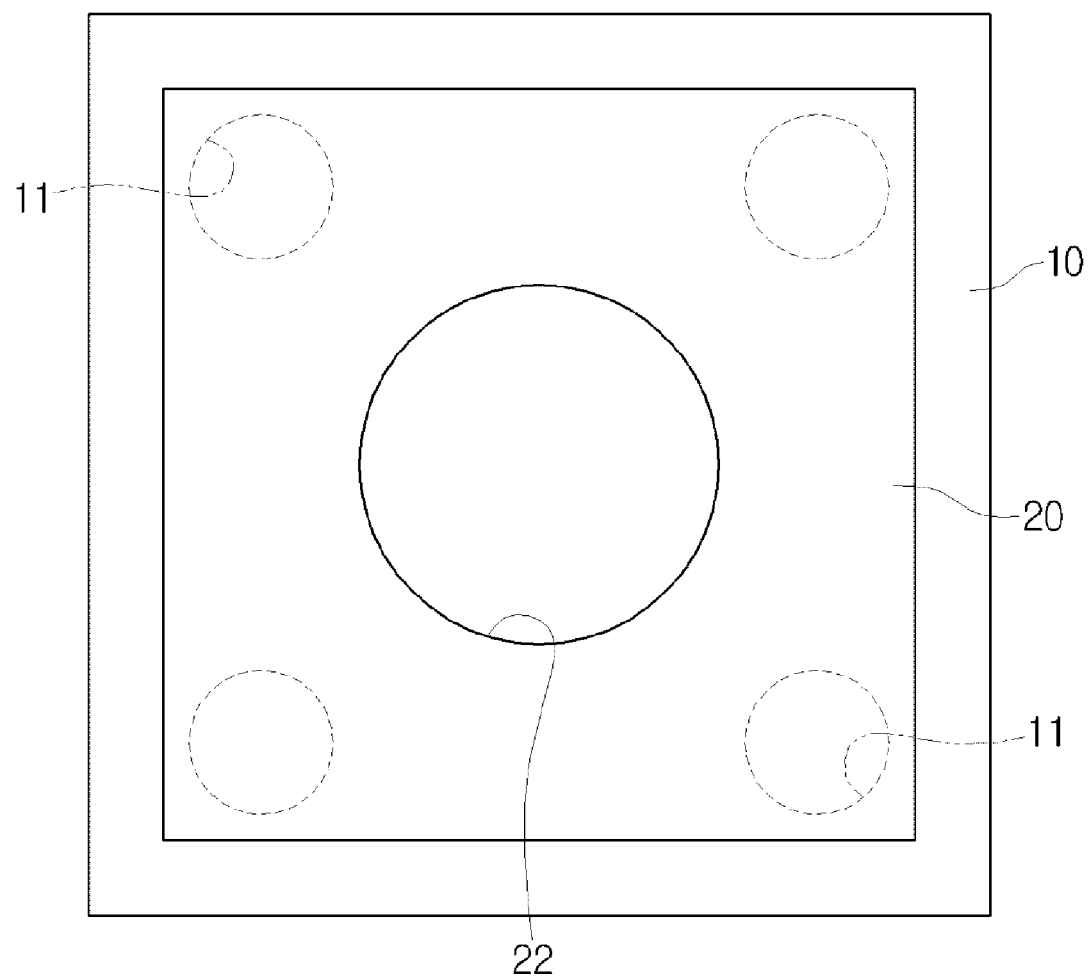
FIG. 3 is a bottom view illustrating the varifocal lens of FIG. 1.

The first light transmission substrate 10 is provided with at least one first operating hole 11, and may be formed of a glass through which a light can pass, that is, an optically transparent glass. Top and bottom surfaces of the first light transmission substrate 10 may be formed flat. Alternatively, one of the top and bottom surfaces of the first light transmission substrate 10 may be formed in an aspherical surface. The first operating hole 11 is formed at a circumference of the first light transmission substrate 10 except a center portion of the first light transmission substrate 10 forming a portion of an optical lens 3. In this exemplary embodiment, as illustrated in FIG. 3, four first operating holes 11 are formed at the first light transmission substrate 10.

The first actuator 20 is disposed at the four first operating holes 11. The first actuator 20 pressurizes a first liquid 33 filled in a first liquid chamber 31 formed between the first light transmission substrate 10 and the lens frame 30. The first actuator 20 is formed to cover the first operating hole 11 and to pressurize the first liquid 33. At this time, the first actuator 20 may be formed to operate in a direction parallel with respect to an optical axis C of the optical lens 3. In this exemplary embodiment, as illustrated in FIG. 3, the first actuator 20 is formed in a rectangular shape and has a size so that the first actuator 20 can cover all the four first operating holes 11. A first through hole 22 is formed at a center of the first actuator 20 so that the light can pass through the first actuator 20. Alternatively, although not illustrated, the first actuator 20 may be formed of four small plates corresponding to the four first operating holes 11, respectively.

The first actuator 20 may be formed of a polymer actuator. When the voltage is applied to the polymer actuator, the polymer actuator expands in a direction. The polymer actuator forms a curved surface as large as the polymer actuator expands, and pressurizes the first liquid 33 in the first liquid chamber 31 via the first operating holes 11. The polymer actuator forming the first actuator 20 may be formed of various polymers having properties as described above. For example, the first actuator 20 may be formed of materials having dielectric elastomers, such as arcrylate, silicone, etc. Also, the first actuator 20 may be formed of materials having electrostrictive polymers, such as copolymers of vinylidene fluoride and trifluoroethylene (PVDF-TrFE), etc., or ion conductive polymers.

Furthermore, as illustrated in FIGS. 1 and 2, a penetration protection membrane 21 may be disposed between the first actuator 20 and the first light transmission substrate 10. The penetration protection membrane 21 prevents the first liquid 33 from leaking from the first liquid chamber 31 through the first actuator 20. The penetration protection membrane 21 may be formed of a material having properties so that it prevents the first liquid 33 from penetrating the first actuator 20 and transforms identically according as the first actuator 20 transforms.

The lens frame 30 is disposed at a top surface of the first light transmission substrate 10. A first groove forming the first liquid chamber 31 is formed at a bottom surface of the lens frame 30. Also, a lens hole 32 in fluid communication with the first liquid chamber 31 is formed at a center of the lens frame 30. The lens frame 30 may be formed of a silicone, or a glass. A light transmission membrane 40 may be disposed at a top surface of the lens frame 30 to cover the lens hole 32. Therefore, when the lens frame 30 is disposed at the top surface of the first light transmission substrate 10 as illustrated in FIGS. 1 and 2, the top surface of the first light transmission substrate 10 and the first groove of the lens frame 30 form the first liquid chamber 31. The first operating holes 11 and the lens hole 32 also form a portion of the first liquid chamber 31, and are filled with the first liquid 33. The light transmission membrane 40 is transformed according to a pressure being applied to the first liquid 33 in the first liquid chamber 31 via the lens hole 32 formed at the lens frame 30.

The light transmission membrane 40 may be formed of an optically transparent and elastically transformable membrane. Therefore, when the first liquid chamber 31 is pressurized, the light transmission membrane 40 is transformed elastically upwardly convexly so that a focal distance of the varifocal lens 1 is varied. When a voltage is applied to the first actuator 20, the light transmission membrane 40 is transformed upwardly convexly as illustrated in FIG. 2. The light transmission membrane 40 may be formed of polydimethylsiloxane (PDMS).

The second light transmission substrate 50 is disposed at the top surface of the lens frame 30. A second groove forming a second liquid chamber 52 is formed at a bottom surface of the second light transmission substrate 50. The second light transmission substrate 50 may be formed of a glass through which a light can pass, that is, an optically transparent glass. Top and bottom surfaces of the second light transmission substrate 50 may be formed flat. Alternatively, one of the top and bottom surfaces of the second light transmission substrate 50 may be formed in an aspherical surface. Also, the second light transmission substrate 50 is provided with at least one second operating hole 51 in fluid communication with the second liquid chamber 52. The second operating hole 51 is formed at a circumference of the second light transmission substrate 50 except a center portion of the second light transmission substrate 50 forming a portion of the optical lens 3. In this exemplary embodiment, four second operating holes 51 are formed at the second light transmission substrate 50 as the same as the first light transmission substrate 10.

A second actuator 60 is disposed at the four second operating holes 51. The second actuator 60 pressurizes a second liquid 53 filled in the second liquid chamber 52 formed between the second light transmission substrate 50 and the lens frame 30. The second actuator 60 is formed to cover the second operating hole 51 and to pressurize the second liquid 53. At this time, the second actuator 60 may be formed to operate in the direction parallel with respect to the optical axis C of the optical lens 3. In this exemplary embodiment, the second actuator 60 is formed in a substantially rectangular plate and has a size so that the second actuator 60 can cover all the four second operating holes 51 the same as the first actuator 20. A second through hole is formed at a center of the second actuator 60 so that a light can pass through the second actuator 60. The second actuator 60 may be formed of the same materials as the first actuator 20, and have the same properties and functions as the first actuator 20. Therefore, a detailed description thereof will be omitted.

Also, another penetration protection membrane 61 may be disposed between the second actuator 60 and the second light transmission substrate 50. The penetration protection membrane 61 prevents the second liquid 53 from leaking from the second liquid chamber 52 through the second actuator 60, and is substantially the same as the penetration protection membrane 21 disposed between the first actuator 20 and the first light transmission substrate 10.

The second actuator 60 is disposed to operate in a direction opposite to the operating direction of the first actuator 20, thereby allowing the first actuator 20 to be restored quickly to its original state. Alternatively, no second actuator 60 may be formed at the top surface of the second light transmission substrate 50. If no second actuator 60 is formed at the top surface of the second light transmission substrate 50, the first actuator 20 is restored to its original state only by restoring forces of the first actuator 20 itself and the light transmission membrane 40. Therefore, a speed in which the first actuator 20 is restored to its original state is slower than when the second actuator 60 is disposed at the second light transmission substrate 50.

Each of the first and second liquid chambers 31 and 52 is filled with each of the first and second liquids 33 and 53. The first and second liquids 33 and 53 may have similar specific gravity, and may have a big difference in refractive index. That is, two liquids having the same specific gravity or that the specific gravity difference therebetween is approximately 0.05 and less may be used as the first and second liquids 33 and 53. Also, two liquids having the refractive index difference therebetween of approximately 0.1 and more may be used as the first and second liquids 33 and 53. The first and second liquids 33 and 53 may use two kinds of liquids different from each other. Specially, the first and second liquids 33 and 53 may use two kinds of liquids being immiscible with each other, so the first and second liquids 33 and 53 may be prevented from penetrating each other through the light transmission membrane 40. For example, water may be used as the first liquid 33, and silicone oil may be used as the second liquid 53. Also, silicone oil may be used as the first liquid 33, and water may be used as the second liquid 53. At this time, in approximately 4° C., specific gravity of pure water is approximately 1, and refractive index of the pure water is approximately 1.33~1.34. Therefore, silicone oil having specific gravity of approximately 0.97 and more and refractive index of approximately 1.4 and more can be used as one of the first and second liquid 33 and 53.

If two kinds of liquids having a small specific gravity difference and a big refractive index difference are used as the first and second liquids 33 and 53 as described above, when the light transmission membrane 40 is set vertically with respect to the ground, a phenomenon that a center axis C of the light transmission membrane 40 moves due to weight of the first liquid 33 may be minimized.

In case of the conventional liquid lens having a structure configured so that the light transmission membrane supports a liquid, since the light transmission membrane of the liquid lens directly contacts air having low density, the liquid lens is affected by gravity. When the liquid lens is affected by gravity, the center axis of the light transmission membrane moves downward so that the light transmission membrane becomes asymmetric. So the liquid lens cannot function as an optical lens. A transformation error of a curved surface of the liquid lens caused by the effect of gravity as described above increases in proportion to the $5^{th}$ power of a lens diameter. However, if the lens radius, that is, a radius of the light transmission membrane is approximately 1 mm and less, gravity does not have great influence on the liquid lens. As a result, the conventional liquid lens can be used only in optical apparatuses using optical lenses having 1 mm and less in a radius thereof.

Approximately, a shape transformation error of the light transmission membrane transformed by weight of the liquid filled in the liquid chamber of the liquid lens is proportional to density of the liquid filled in the liquid chamber, is in inverse proportion to Young's modulus of the light transmission membrane, is proportional to the $5^{th}$ power of a diameter of the light transmission membrane, and is in inverse proportion to the $3^{rd}$ power of a thickness of the light transmission membrane. Therefore, if a liquid having the same specific gravity as that of the liquid filled in the liquid chamber of the liquid lens is configured to support the light transmission membrane, the shape error of the light transmission membrane becomes almost zero. Also, when specific gravity difference between two liquids in opposite sides of the light transmission membrane is 0.001, the dimension of the diameter of the light transmission membrane can be increased by approximate four times.

The controller 70 is configured to apply a voltage to each of the first and second actuators 20 and 60, thereby changing the focal distance of the varifocal lens 1 according to the distance to a photographing object. The controller 70 includes a focal distance determining part to determine the focal distance of the varifocal lens according to the distance to the photographing object, and a power part to supply a predetermined electrical power corresponding to the focal distance determined by the focal distance determining part. A method in which the focal distance determining part of the controller 70 determines the focal distance of the varifocal lens 1 according to the distance to the photographing object can use the conventional method. Therefore, a detailed description thereof will be omitted.

In the above explanation, the varifocal lens 1 is formed to have a stack structure in which the first light transmission substrate 10, the lens frame 30, and the second light transmission substrate 50 are stacked up in order. Alternatively, the varifocal lens 1 may be formed in a single body. In this case, the first and second light transmission substrates 10 and 50, and the lens frame 30 form a hollow case, and each of the first and second light transmission substrates 10 and 50 forms a first sidewall and a second sidewall of the case. The light transmission membrane 40 partitions an inner space of the case into two spaces, thereby forming the first and second liquid chambers 31 and 52. The case may be formed of a glass or a polymer molding. Structures of the other elements are the same as those of the varifocal lens 1 according to an exemplary embodiment as described above.

Figure 4:
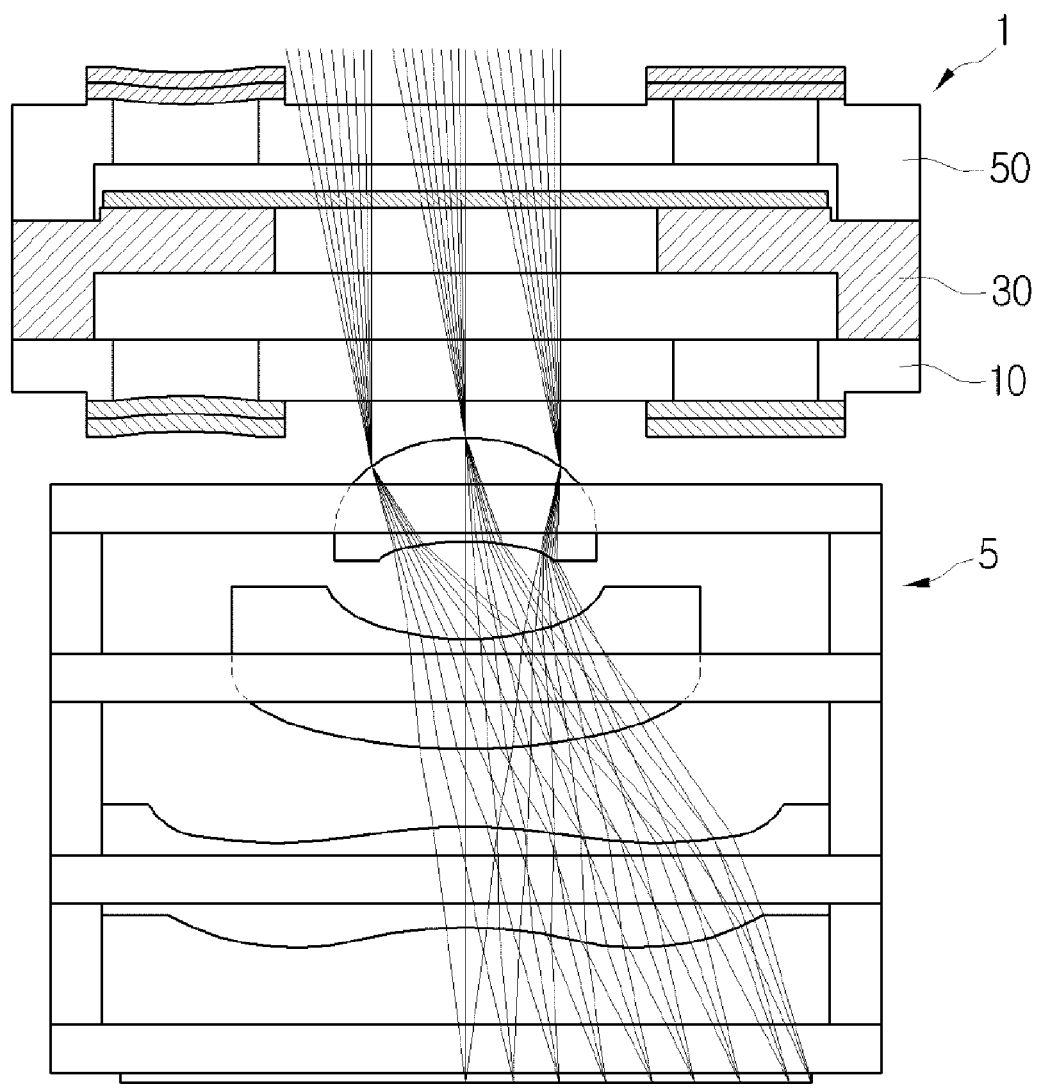
FIG. 4 is a sectional view schematically illustrating a camera module having a varifocal lens according to an exemplary embodiment of the present invention.

The varifocal lens 1 according to an exemplary embodiment of the present invention, as illustrated in FIG. 4, can be disposed in front of the conventional camera module 5. At this time, the varifocal lens 1 according to an exemplary embodiment of the present invention performs an auto focus function and a zoom function.

Hereinafter, operation of the varifocal lens 1 according to an exemplary embodiment of the present invention having the structure as described above will be explained in detail with reference to FIGS. 1 and 2.

When the light transmission membrane 40 of the varifocal lens 1 is set vertical with respect to the ground for photographing, the center axis C of the light transmission membrane 40 does not move since the varifocal lens 1 according to the present invention is configured so that the light transmission membrane 40 is supported by two liquids 33 and 53 having substantially same specific gravity. In this exemplary embodiment, the first and second light transmission substrates 10 and 50, the first and second liquids 33 and 53, and the light transmission membrane 40 of the varifocal lens 1 form one optical lens 3. The controller 70 controls the voltage applied to the first and second actuators 20 and 60 according to the distance to the photographing object so that a focal distance of the optical lens 3 of the varifocal lens 1 is adjusted to correspond to the distance to the photographing object. That is, when the controller 70 applies the voltage to the first actuator 20, as illustrated in FIG. 2, the first actuator 20 is convexly transformed toward the inside of the first operating hole 11. When the first actuator 20 is transformed toward the inside of the first operating hole 11, the first liquid 33 in the first liquid chamber 31 is pressurized, so the light transmission membrane 40 above the lens hole 32 of the lens frame 30 is convexly transformed upward. As described above, to control the voltage applied to the first actuator 20 allows the curvature of the light transmission membrane 40 to be changed. Therefore, the controller 70 can suitably controls the focal distance of the optical lens 3 according to the distance to the photographing object.

Additionally, when restoring the light transmission membrane 40 to its original state, the controller 70 applies a predetermined voltage to the second actuator 60. When the voltage is applied to the second actuator 60, the second actuator 60 is convexly transformed toward the second operating hole 51. When the second actuator 60 is transformed toward the second operating hole 51, the second liquid 53 in the second liquid chamber 52 is pressurized, so the light transmission membrane 40 on the lens frame 30 is transformed downward to restore to its original state by the second liquid 53.

With the varifocal lens 1 according to an exemplary embodiment of the present invention, even when the light transmission membrane 40 has a large diameter, the varifocal lens 1 is not influenced by gravity and can automatically focus. Therefore, the varifocal lens 1 according to the present invention can be used in camera modules requiring an auto focus function and a zoom function.

Also, the varifocal lens 1 according to an exemplary embodiment of the present invention is very thin so that it can be used in camera modules usable with an individual portable device such as a cellular phone, etc.

Additionally, the varifocal lens 1 according to an exemplary embodiment of the present invention is configured to have the first and second actuator 20 and 60 that operate in a direction opposite each other so that a focusing operation is fast.

Furthermore, with the varifocal lens 1 according to an exemplary embodiment of the present invention, processes disposing each of the first and second actuators 20 and 60 on each of the first and second light transmission substrates 10 and 50 and disposing the light transmission membrane 40 on the lens frame 30 can use a general semiconductor fabrication process in a wafer level. Therefore, manufacturing cost thereof can be reduced.

Hereinafter, a varifocal lens 100 according to another exemplary embodiment of the present invention will be explained with respect to FIGS. 5 and 6.

Figure 5:
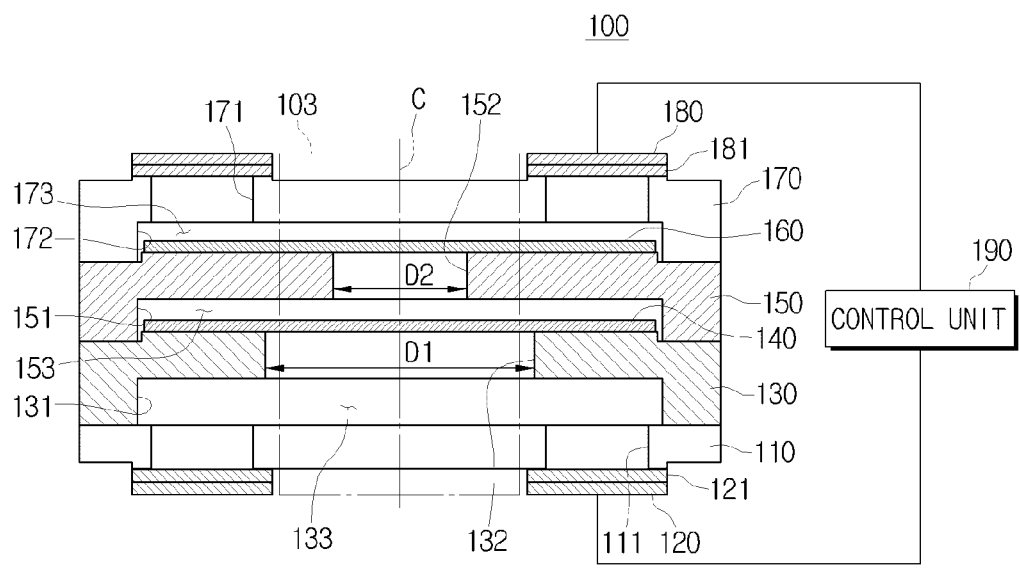
FIG. 5 is a sectional view schematically illustrating a varifocal lens according to an exemplary embodiment of the present invention.

Referring to FIG. 5, the varifocal lens 100 according to another exemplary embodiment of the present invention includes a first light transmission substrate 110, a first lens frame 130, a second lens frame 150, a second light transmission substrate 170, and a controller 190.

The first and second light transmission substrates 110 and 170 are formed to have the same structure as the first and second light transmission substrates 10 and 50 of the varifocal lens 1 according to an exemplary embodiment of the present invention as described above. Also, the first lens frame 130 is formed to have a similar structure to the lens frame 30 of the varifocal lens 1 according to an exemplary embodiment of the present invention as described above. Therefore, a first actuator 120 to cover at least one first operating hole 111 is disposed at a bottom surface of the first light transmission substrate 110, and a second actuator 180 to cover at least one second operating hole 171 is disposed at a top surface of the second light transmission substrate 170.

The second lens frame 150 is disposed at a top surface of the first lens frame 130, and includes a groove forming a second liquid chamber 151 and a second lens hole 152. A diameter D2 of the second lens hole 152 is smaller than a diameter D1 of a first lens hole 132 formed at the first lens frame 130. Also, a second light transmission membrane 160 is disposed at a top surface of the second lens frame 150 to cover the second lens hole 152. The function and materials of the first and second light transmission membranes 140 and 160 disposed at each of the first and second lens frames 130 and 150 are the same as those of the light transmission membrane 40 of the varifocal lens 1 according to an exemplary embodiment of the present invention as described above. Therefore, detailed descriptions thereof will be omitted.

A first liquid chamber 131 is formed between the first light transmission substrate 110 and the first lens frame 130, and a second liquid chamber 151 is formed between the first lens frame 130 and the second lens frame 150. A third liquid chamber 172 is formed between the second lens frame 150 and the second light transmission substrate 170. The first, second, and third liquid chambers 131, 151 and 172 are filled up with first, second, and third liquids 133, 153 and 173, respectively. Three liquids having a little specific gravity difference therebetween may be used as the first, second, and third liquids 133, 153, and 173. In this exemplary embodiment, three liquids having a specific gravity difference of approximately 0.05 and less are used as the first, second, and third liquids 133, 153, and 173. Also, refractive index of the second liquid 153 may be larger than refractive index of each of the first and third liquids 133 and 173.

The controller 190 is configured to control the first and second actuator 120 and 180 to change a focal distance of an optical lens 103 consisting of the first and second light transmission substrates 110 and 170, the first, second, and third liquids 133, 153 and 173, and the first and second light transmission membranes 140 and 160.

Figure 6:
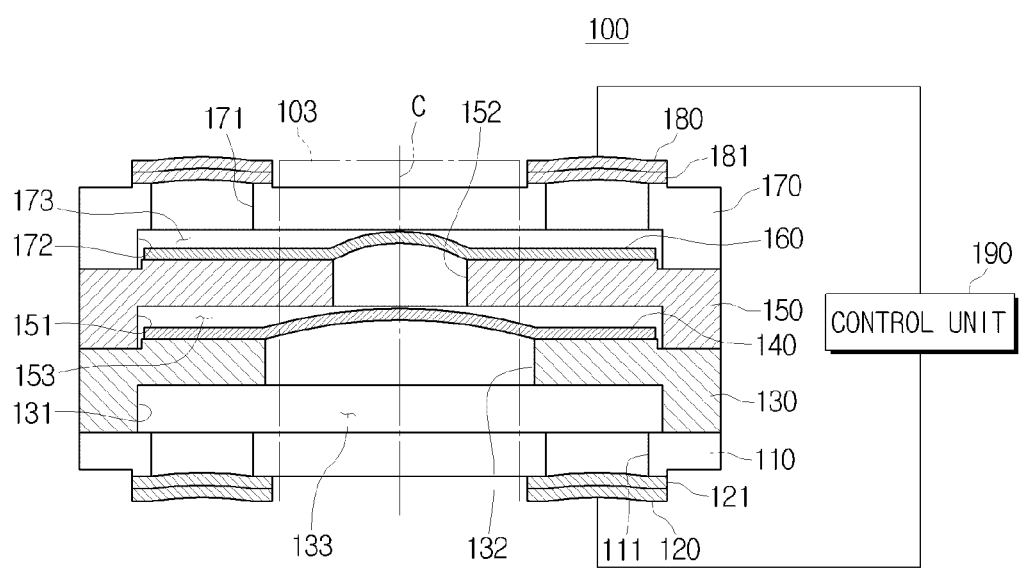
FIG. 6 is a sectional view schematically illustrating the varifocal lens of FIG. 5 when a first actuator of the varifocal lens operates.

When the controller 190 applies a predetermined voltage to the first actuator 120, as illustrated in FIG. 6, the first actuator 120 is transformed to pressurize the first liquid 133 in the first liquid chamber 131. So the first light transmission membrane 140 of the first lens frame 130 is convexly transformed upwardly. When the first light transmission membrane 140 is convexly transformed upwardly, the second liquid 153 in the second liquid chamber 151 is pressurized so that the second light transmission membrane 160 of the second lens frame 150 is convexly transformed upwardly.

When restoring the first and second light transmission membranes 140 and 160 to their original states, the controller 190 applies a predetermined voltage to the second actuator 180. When the voltage is applied to the second actuator 180, the second actuator 180 is transformed toward the second operating hole 171 to pressurize the third liquid 173 in the third liquid chamber 172. When the third liquid 173 is pressurized, the second light transmission membrane 160 is pressurized downwardly, and then, is restored to its original state. When the second light transmission membrane 160 is restored to its original state, the first light transmission membrane 140 is also restored to its original state by the second liquid 153.

With the varifocal lens 103 according to an exemplary embodiment of the present invention, the first and second light transmission membranes 140 and 160 are disposed one above another, and the second liquid 153 having refractive index larger than that of each of the first and third liquids 133 and 173 is filled up between the first and second light transmission membranes 140 and 160 so that a curved surface formed by the first light transmission membrane 140 may function as an additional aspheric lens. Therefore, when doing macro photography using the auto focus function, an optical resolution of a circumferential portion of the varifocal lens 100 may be prevented from decreasing. Generally, a phenomenon in which the optical resolution of the circumferential portion of a lens is decreased may occur when photographing a photographing object in a close distance within 10 mm using a plano-concave type lens by auto focus function. The plano-concave lens is configured to have a flat surface and a curved surface facing each other.

Also, with the varifocal lens 100 according to an exemplary embodiment of the present invention, opposite surfaces of each of the first and second light transmission membranes 140 and 160 are supported by the first, second, and third liquids 133, 153 and 173 having substantially same specific gravity or having specific gravity difference of approximately 0.05 and less so that gravity operating on the first, second, and third liquids 133, 153 and 173 does not almost transform the first and second light transmission membranes 140 and 160. Therefore, the center axis C of the optical lens 103 of the varifocal lens 100 does not move downwardly.

While the embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A varifocal lens comprising:
a hollow case having first and second sidewalls facing each other, the first and second sidewalls through which a light passes;
at least one light transmission membrane partitioning an inner space of the case into at least two liquid chambers, the at least one light transmission membrane through which a light passes, and the at least one light transmission membrane being fixed to the case;
at least two liquids filled in the at least two liquid chambers;
at least one first operating hole formed at the first sidewall;
a first actuator disposed to cover the at least one first operating hole and to pressurize the liquid contacting the first sidewall; and
a controller configured to control the first actuator to change a focal distance of an optical lens consisting of the first and second sidewalls, the at least two liquids, and the at least one light transmission membrane of the case.

2. The varifocal lens of claim 1, wherein the at least two liquids comprises two liquids having the same specific gravity or two liquids having specific gravity difference of approximately 0.05 and less.

3. The varifocal lens of claim 2, wherein the at least two liquids comprises two liquids having refractive index difference of approximately 0.1 and more.

4. The varifocal lens of claim 1, wherein the at least one light transmission membrane comprises a polydimethylsiloxane (PDMS).

5. The varifocal lens of claim 1, wherein the first actuator is formed of a material including dielectric elastomers.

6. The varifocal lens of claim 1, wherein the first actuator is formed of a material including electrostrictive polymers.

7. The varifocal lens of claim 1, wherein the first actuator is formed of ion conductive polymers.

8. The varifocal lens of claim 1, wherein the at least two liquids comprises two liquids of different kinds from each other.

9. The varifocal lens of claim 8, wherein one of the at least two liquids is one of water and oil, and the other liquid is the rest one of the water and oil.

10. The varifocal lens of claim 8, wherein the at least two liquids are immiscible with each other.

11. The varifocal lens of claim 1, wherein the second sidewall comprises;
at least one second operating hole; and
a second actuator disposed to cover the at least one second operating hole.

12. The varifocal lens of claim 11, wherein each of the first and second actuator is disposed to operate in a direction parallel with respect to an optical axis of the optical lens.

13. The varifocal lens of claim 1, wherein the case is formed of a glass.

14. The varifocal lens of claim 1, wherein the case is formed of a polymer molding.

15. A varifocal lens comprising:
a first liquid chamber filled with a first liquid;
a second liquid chamber filled with a second liquid, the second liquid having the same specific gravity as that of the first liquid, or the second liquid having specific gravity difference between the first and second liquids of approximately 0.05 and less, and the second liquid having refractive index difference between the first and second liquids of approximately 0.1 and more;
a light transmission membrane fixed between the first and second liquid chambers;
a first actuator disposed at the first liquid chamber to pressurize the first liquid; and
a controller operating the first actuator;
wherein the controller controls the first actuator to change a focal distance of an optical lens consisting of the first liquid chamber, the first liquid, the light transmission membrane, the second liquid, and the second liquid chamber.

16. The varifocal lens of claim 15, further comprising:
a second actuator disposed at the second liquid chamber to pressurize the second liquid according to a control of the controller.

17. The varifocal lens of claim 1, wherein the first actuator is a flexible member.

18. The varifocal lens of claim 17, wherein a change in shape of the first actuator pressurizes the liquid contacting the first sidewall and the at least one light transmission membrane.

19. The varifocal lens of claim 5, wherein the dielectric elastomer is one of arcrylate and silicone.

20. The varifocal lens of claim 6, wherein the electrorestrictive polymers include copolymers of vinylidene fluoride and trifluoroethylene (PVDF-TrFE).

* * * * *